United States Patent
Yamaguchi

(10) Patent No.: US 9,203,340 B2
(45) Date of Patent: Dec. 1, 2015

(54) TEMPERATURE ESTIMATION DEVICE ESTIMATING TEMPERATURE OF POWER SEMICONDUCTOR CHIP, AND MOTOR CONTROL DEVICE INCLUDING THE SAME

(71) Applicant: FANUC Corporation, Yamanashi (JP)

(72) Inventor: Ryouta Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/300,006

(22) Filed: Jun. 9, 2014

(65) Prior Publication Data
US 2014/0361721 A1   Dec. 11, 2014

(30) Foreign Application Priority Data
Jun. 10, 2013   (JP) .................... 2013-122165

(51) Int. Cl.
*G05B 5/00* (2006.01)
*H02P 29/00* (2006.01)
*G01K 7/42* (2006.01)
*H02P 5/52* (2006.01)

(52) U.S. Cl.
CPC ............ *H02P 29/0088* (2013.01); *G01K 7/427* (2013.01); *H02P 5/526* (2013.01)

(58) Field of Classification Search
CPC .... G01K 7/42; H02K 11/001; H02P 29/0088; H03K 2017/0806
See application file for complete search history.

(56) References Cited

U.S. PATENT DOCUMENTS

| | | | |
|---|---|---|---|
| 2011/0279074 A1* | 11/2011 | Yeh et al. | ............ 318/432 |
| 2012/0249039 A1 | 10/2012 | Usami et al. | |
| 2013/0049454 A1 | 2/2013 | Le et al. | |

FOREIGN PATENT DOCUMENTS

| | | |
|---|---|---|
| CN | 1866717 A | 11/2006 |
| JP | 7135731 A | 5/1995 |
| JP | 2011-036095 A | 2/2011 |
| WO | 2012118625 A2 | 9/2012 |
| WO | 2013/034400 A1 | 3/2013 |
| WO | 2014091852 A1 | 6/2014 |

* cited by examiner

*Primary Examiner* — Karen Masih
(74) *Attorney, Agent, or Firm* — Hauptman Ham, LLP

(57) ABSTRACT

A temperature calculation unit calculates a temperature T1 of one power semiconductor chip as a temperature estimating target, from a reference temperature, a temperature difference $\Delta T1$, and a temperature difference $\Delta T2$. The temperature difference $\Delta T1$ is calculated based on an electric power loss Q1 generated in all power semiconductor chips of a power semiconductor module containing one power semiconductor chip as the temperature estimating target. The temperature difference $\Delta T2$ is calculated based on the electric power loss Q1 and an electric power loss Q2 generated in all power semiconductor chips of a power semiconductor module other than the power semiconductor module containing one power semiconductor chip as the temperature estimating target.

8 Claims, 5 Drawing Sheets

TEMPERATURE ESTIMATION DEVICE ESTIMATING TEMPERATURE OF POWER SEMICONDUCTOR CHIP, AND MOTOR CONTROL DEVICE INCLUDING THE SAME

RELATED APPLICATIONS

The present application claims priority to Japanese Application Number 2013-122165, filed Jun. 10, 2013, the disclosure of which is hereby incorporated by reference herein in its entirety.

BACKGROUND OF THE INVENTION

1. Field of the Invention

The present invention relates to a temperature estimation device estimating a temperature of one power semiconductor chip that is a temperature estimating target and that is included in one or more power semiconductor chips contained in one power semiconductor module included in power semiconductor modules of which number is equal to or larger than the number of motors and that are arranged in the same heat radiator for driving a plurality of motors, respectively. Further, the present invention relates to a motor control device including the temperature estimation device.

2. Description of the Related Art

In order to drive a motor for a feed shaft of a machine tool, a motor for a main shaft of a machine tool, a motor for an arm of an industrial robot, etc., a converter and an inverter are used. The converter and the inverter are each constituted by a power semiconductor module containing at least one power semiconductor chip on which power semiconductors such as a transistor, a diode, and a thyristor are mounted. A temperature of the power semiconductor chip rises by an electric power loss generated at the time of energization of the power semiconductors, and by an electric power loss generated at the time of switching of the power semiconductors. There is a possibility that when a temperature of the power semiconductor chip exceeds a predetermined temperature (e.g., a rated temperature set by a manufacturer of the power semiconductors), an adverse influence (degradation of the power semiconductor chip, breaking of the power semiconductor chip, or the like) of heat on the power semiconductor chip is generated. Accordingly, in order to maintain a temperature of the power semiconductor chip lower than the temperature that can cause the adverse influence of heat on the power semiconductor chip, it is necessary to accurately estimate a temperature of the power semiconductor chip.

For example, as described in Japanese Laid-open Patent Publication No. 2011-36095, conventionally, there was proposed a temperature estimation device estimating a temperature of one power semiconductor chip as a temperature estimating target on the basis of a reference temperature calculated from an electric power loss of all power semiconductor chips in a power semiconductor module, and on the basis of a temperature difference between the reference temperature and a temperature of the power semiconductor module. This temperature estimation device was proposed as a temperature estimation device estimating a temperature of one power semiconductor chip that is a temperature estimating target included in one or more power semiconductor chips contained in one power semiconductor module for driving one motor.

In recent years, in order to reduce a size of a machine tool, an industrial robot or the like, a system which a plurality of inverters, i.e., a plurality of power semiconductor modules, connected in parallel with each other for respectively driving a plurality of motors by one alternating-current (AC) power supply are arranged in the same heat radiator, has been used. In such a system, when a temperature of one power semiconductor chip that is a temperature estimating target is estimated on the basis of a reference temperature calculated from an electric power loss of all power semiconductor chips in one power semiconductor module, and on the basis of a temperature difference between the reference temperature and a temperature of the power semiconductor module in order to estimate the temperature of one power semiconductor chip as the temperature estimating target included in one or more power semiconductor chips contained in one power semiconductor module included in a plurality of the power semiconductor modules, the temperature of one power semiconductor chip that is the temperature estimating target is difficult to accurately estimate. This is because the estimation does not take into consideration influence of heat on the heat radiator caused by all of power semiconductor chips contained in one or more power semiconductor modules other than the power semiconductor module that contains one power semiconductor chip as the temperature estimating target. This influence is an electric power loss generated in one or more power semiconductor modules other than one power semiconductor module that is the temperature estimating target.

SUMMARY OF THE INVENTION

An object of the present invention is to provide a temperature estimation device that can accurately estimate a temperature of one power semiconductor chip as a temperature estimating target included in one or more power semiconductor chips contained in one power semiconductor module included in power semiconductor modules of which number is equal to or larger than the number of motors and that are arranged in the same heat radiator, and to provide a motor control device including the temperature estimation device.

The temperature estimation device is a temperature estimation device estimating a temperature of one power semiconductor chip that is a temperature estimating target and that is included in one or more power semiconductor chips contained in one power semiconductor module out of power semiconductor modules of which the number is equal to or larger than the number of a plurality of motors and that are arranged in the same heat radiator for driving the plurality of motors, respectively, the temperature estimation device including: a first electric power loss calculation unit calculating a first electric power loss corresponding to an electric power loss generated in all power semiconductor chips of the power semiconductor module containing the one power semiconductor chip that is the temperature estimating target; a first temperature difference calculation unit calculating, on the basis of the first electric power loss, a first temperature difference corresponding to a temperature difference between the heat radiator and the power semiconductor module containing the one power semiconductor chip that is the temperature estimating target; a second temperature difference calculation unit calculating, on the basis of the first electric power loss and a second electric power loss, a second temperature difference corresponding to a temperature difference between the heat radiator and a reference temperature, the second electric power loss corresponding to an electric power loss generated in all power semiconductor chips of one or more power semiconductor modules other than the power semiconductor module containing the one power semiconductor chip that is the temperature estimating target; a temperature calculation unit calculating a temperature of the one power semiconductor chip that is the temperature estimating target, on the basis of the reference temperature, the first temperature difference, and the second temperature difference; and a temperature output unit outputting the temperature calculated by the temperature calculation unit.

Preferably, the first electric power loss calculation unit calculates the first electric power loss on the basis of one of an electric current and an electric current command value, the electric current flowing through one motor corresponding to the power semiconductor module containing the one power semiconductor chip that is the temperature estimating target, and the electric current command value being generated for the one motor corresponding to the power semiconductor module containing the one power semiconductor chip that is the temperature estimating target.

Preferably, the first electric power loss calculation unit calculates the first electric power loss depending on a carrier frequency of a PWM signal or PWM signals input to the power semiconductor module containing the one power semiconductor chip that is the temperature estimating target.

Preferably, the temperature estimation device further includes a second electric power loss calculation unit calculating the second electric power loss.

Preferably, the second electric power loss calculation unit calculates the second electric power loss on the basis of one of an electric current or electric currents flowing through one or more motors other than one motor corresponding to the power semiconductor module containing the one power semiconductor chip that is the temperature estimating target, and an electric current command value or electric current command values for the one or more motors other than the one motor corresponding to the power semiconductor module containing the one power semiconductor chip that is the temperature estimating target.

Preferably, the second electric power loss calculation unit calculates the second electric power loss depending on a carrier frequency of a PWM signal or PWM signals input to the one or more power semiconductor modules other than the power semiconductor module containing the one power semiconductor chip that is the temperature estimation target.

The motor control device is a motor control device for controlling motors that are driven by electric power stored in a DC link unit connected to an AC power supply via a converter constituted by one power semiconductor module containing at least one semiconductor chip, the motor control device including the temperature estimation device according to the present invention.

Preferably, the motor control device restricts or stops output of the motors when a temperature estimated by the temperature estimation device exceeds the reference temperature.

BRIEF DESCRIPTION OF THE DRAWINGS

The present invention will be more clearly understood by referring to the accompanying drawings in which.

DETAILED DESCRIPTION

Figure 1:
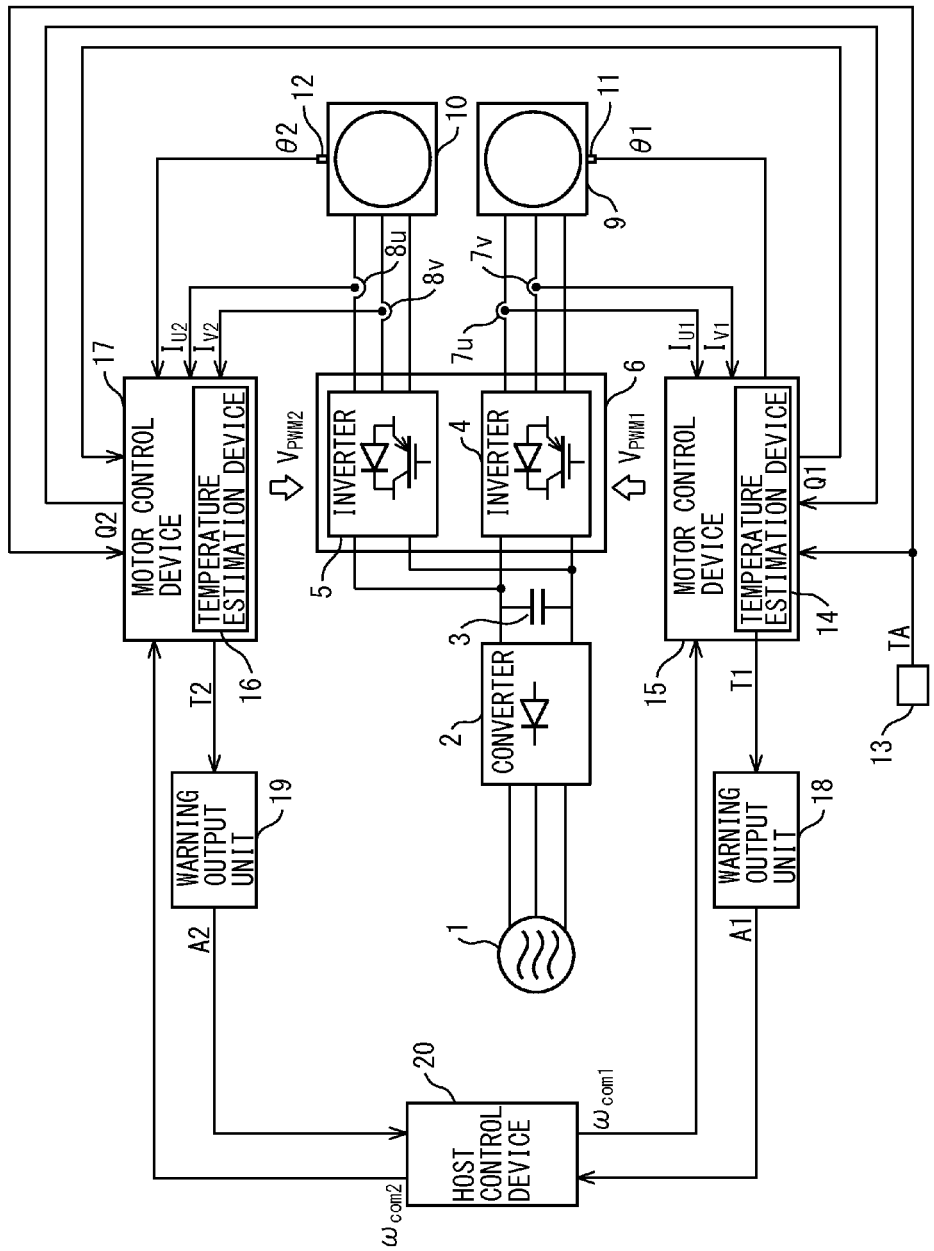
FIG. 1 is a block diagram of a system including a motor control device including a temperature estimation device according to a first embodiment.

In the following, a temperature estimation device estimating a temperature of a power semiconductor chip, and a motor control device including the temperature estimation device will be described with reference to the drawings. However, it is to be understood that the present invention is not limited to the drawings and the embodiments described in the following.

Embodiments of a temperature estimation device and a motor control device according to the present invention will be described in detail with reference to the drawings. In the drawings, the same reference symbols are assigned to the same constituent elements.

Figure 2:
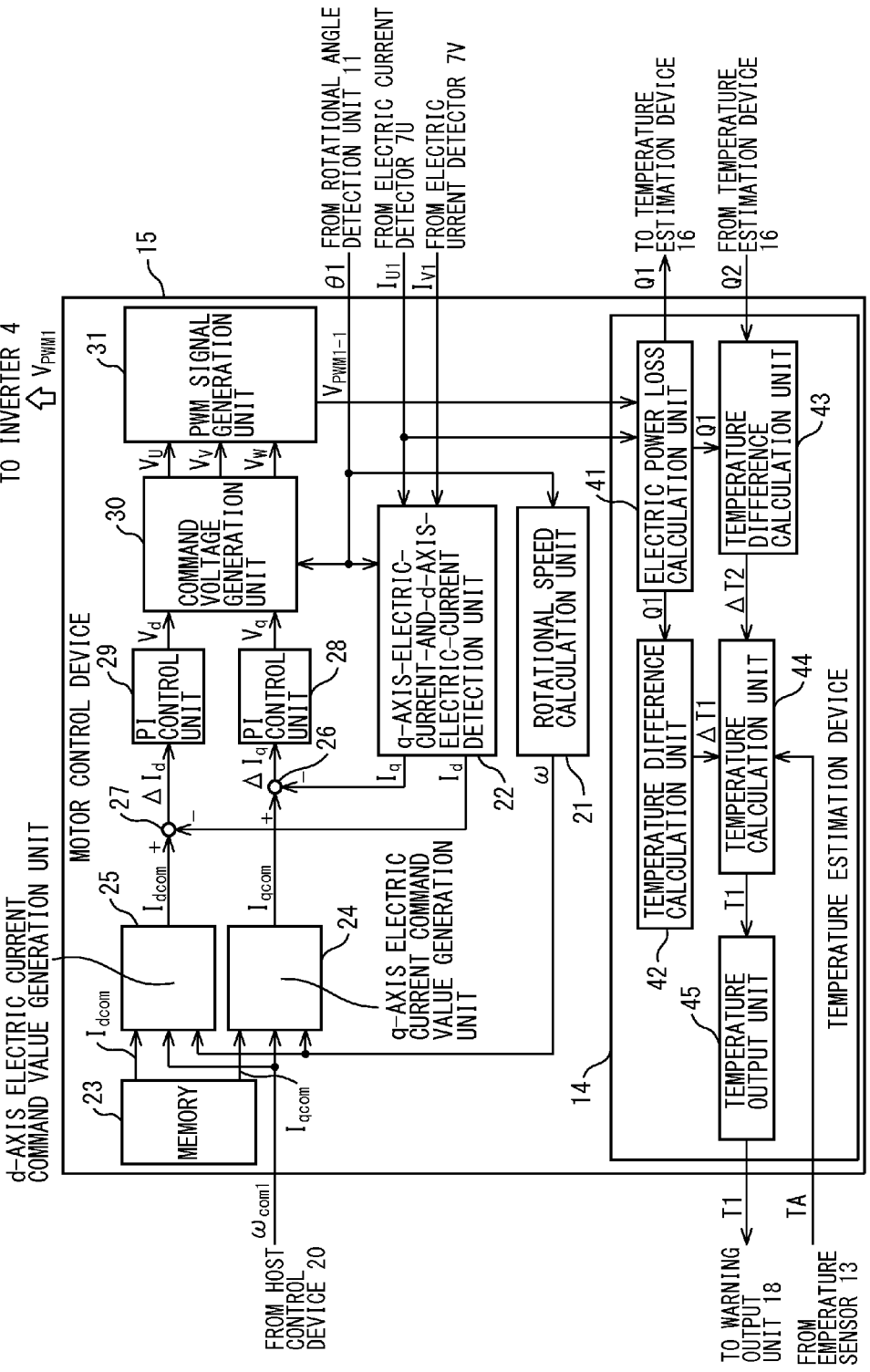
FIG. 2 is a block diagram of the motor control device including the temperature estimation device according to the first embodiment.

FIG. 1 is a block diagram of a system including a motor control device including a temperature estimation device according to a first embodiment. FIG. 2 is a block diagram of the motor control device including the temperature estimation device according to the first embodiment. The system illustrated in FIG. 1 is used in a machine tool, an industrial robot, or the like, and includes a three-phase AC power supply 1, a converter 2, a smoothing capacitor 3, inverters 4 and 5 as power semiconductor modules, a heat radiator 6, electric current detectors 7U, 7V, 8U and 8V, motors 9 and 10, rotational angle detection units 11 and 12, a temperature sensor 13, a motor control device 15 including a temperature estimation device 14, a motor control device 17 including a temperature estimation device 16, warning output units 18 and 19, and a host control device 20.

The converter 2 is, for example, constituted by one power semiconductor module containing a plurality of (six for three-phase AC) power semiconductor chips on which rectifier diodes are mounted. The converter 2 converts AC power supplied from the three-phase AC power supply 1 into direct-current (DC) power. The smoothing capacitor 3 is connected in parallel with the converter 2 for smoothing a voltage rectified by the rectifying diodes of the converter 2. The inverter 4 is connected in parallel with the smoothing capacitor 3. The inverter 4 is, for example, constituted by one power semiconductor module containing a plurality of (six for three-phase AC) power semiconductor chips on which rectifier diodes are mounted, and containing a plurality of (six for three-phase AC) power semiconductor chips on which transistors connected antiparallel with respective rectifier diodes are mounted. The inverter 4 performs on-off operation of the transistors on the basis of a PWM signal $V_{PWM1}$ which will be described later to invert the DC power converted by the converter 2 into Ac power. The inverter 5 is connected in parallel with the smoothing capacitor 3. The inverter 5 is constituted by, for example, one power semiconductor module containing a plurality of (six for three-phase AC) power semiconductor chips on which rectifier diodes are mounted, and containing a plurality of (six for three-phase AC) power semiconductor chips on which transistors connected antiparallel with respective rectifier diodes are mounted. The inverter 5 performs on-off operation of the transistors on the basis of a PWM signal $V_{PWM2}$ which will be described later to invert the DC power converted by the converter 2 into Ac power.

In the heat radiator 6, the inverters 4 and 5 are arranged. Thereby, the heat radiator 6 cools the inverters 4 and 5 by radiating heat that is generated by an electric power loss caused at the time of energization of the rectifying diodes and the transistors included in the inverters 4 and 5, and heat that is generated by an electric power loss caused at the time of switching of the transistors included in the inverters 4 and 5.

The electric current detectors 7U and 7V are provided at output lines of the inverter 4 for detecting a U-phase electric current $I_{U1}$ and a V-phase electric current $I_{V1}$ of two phases out of the U-phase electric current $I_{U1}$ and the V-phase electric current $I_{V1}$, and a W-phase electric current $I_{W1}$ of three phases flowing through the motor 9. The electric current detectors 8U and 8V are provided at output lines of the inverter 5 for detecting a U-phase electric current $I_{U2}$ and a V-phase electric current $I_{V2}$ of two phases out of the U-phase electric current $I_{U2}$ and the V-phase electric current $I_{V2}$, and a W-phase electric current $I_{w2}$ of three phases flowing through the motor 10. The electric current detectors 7U, 7V, 8U and 8V are constituted by detection resistances or Hall elements, for example.

The motors 9 and 10 are driven by an electric power stored in the smoothing capacitor 3. When the system illustrated in FIG. 1 is used in a machine tool, either the motor 9 or the motor 10 serves as a gravity-axis servomotor that drives a main shaft of the machine tool in a gravity-axis direction (Z-axis direction) by a feed screw mechanism such as a ball-screw-and-nut mechanism, and the other of the motors 9 and 10 serves as a main-shaft motor that drives a tool attached to the main shaft of the machine tool, for example. When the system illustrated in FIG. 1 is used in an industrial robot, each of the motors 9 and 10 serves as a gravity-axis servomotor that drives one arm out of a plurality of arms of the industrial robot in a gravity-axis direction (Z-axis direction).

The rotational angle detection unit 11 is constituted by a rotary encoder, a Hall element, a resolver, or the like for detecting a rotational angle θ1 of the motor 9. The rotational angle detection unit 12 is constituted by a rotary encoder, a Hall element, a resolver, or the like for detecting a rotational angle θ2 of the motor 10. The temperature sensor 13 is constituted by a thermistor or the like for detecting an outside air temperature TA as a reference temperature.

The motor control device 15 includes a rotational speed calculation unit 21, a q-axis-electric-current-and-d-axis-electric-current detection unit 22, a memory 23, a q-axis electric current command value generation unit 24, a d-axis electric current command value generation unit 25, subtracters 26 and 27, PI control units 28 and 29, a command voltage generation unit 30, and a PWM signal generation unit 31 to control the motor 9.

The rotational speed calculation unit 21 receives a rotational angle θ1 from the rotational angle detection unit 11, and differentiates the input rotational angle θ1 with respect to time to calculate a rotational speed U) of the motor 9 corresponding to a frequency of a U-phase electric current $I_U$, a V-phase electric current $I_V$, and a W-phase electric current $I_W$. The rotational speed calculation unit 21 outputs the rotational speed ω to the q-axis electric current command value generation unit 24 and the d-axis electric current command value generation unit 25.

The q-axis-electric-current-and-d-axis-electric-current detection unit 22 receives, from the respective electric current detectors 7U and 7V, a U-phase electric current $I_{U1}$ and a V-phase electric current $I_{V1}$ of the two phases out of the U-phase electric current $I_{U1}$, the V-phase electric current $I_{V1}$ and a W-phase electric current $I_{W1}$ of the three phases flowing through the motor 9, extracts the W-phase electric current $I_{W1}$ on the basis of the U-phase electric current $I_{U1}$ and the V-phase electric current $I_{V1}$ of the two phases, and detects a q-axis electric current $I_q$ and a d-axis electric current $I_d$ on the basis of the rotational angle θ1, and the U-phase electric current $I_{U1}$, the V-phase electric current $I_{V1}$ and the W-phase electric current $I_{W1}$ of the three phases flowing through the motor 9. For this purpose, the q-axis-electric-current-and-d-axis-electric-current detection unit 22 is constituted by a coordinate conversion unit performing rotational coordinate conversion and three-phase-to-two-phase conversion. Accordingly, the q-axis-electric-current-and-d-axis-electric-current detection unit 22 converts the U-phase electric current $I_{U1}$, the V-phase electric current $I_{V1}$ and the W-phase electric current $I_{W1}$ of the three phases in a fixed coordinate system (U-V-W coordinate system) into the q-axis electric current $I_q$ and the d-axis electric current $I_d$ of the two phases expressed by a rotational coordinate system that is rotated by the rotational angle θ1 with respect to a fixed coordinate system (α-β coordinate system). Then, the q-axis-electric-current-and-d-axis-electric-current detection unit 22 outputs the q-axis electric current $I_q$ and the d-axis electric current $I_d$ to the subtracters 26 and 27, respectively.

The memory 23 stores a look-up table representing a relation among a rotational speed command $\omega_{com1}$ an actual rotational speed ω of the motor 9, and a q-axis electric current command value $I_{qcom}$ and a d-axis electric current command value $I_{dcom}$. The rotational speed command $\omega_{com1}$ is a speed command value for the motor 9 input from the host control device 20 to the motor control device 15. The actual rotational speed ω of the motor 9 corresponds to a position or a speed of the motor 9 input from the rotational speed calculation unit 21 to the q-axis electric current command value generation unit 24 and the d-axis electric current command value generation unit 25.

The q-axis electric current command value generation unit 24 generates a q-axis electric current command value $I_{qcom}$. For this purpose, the q-axis electric current command value generation unit 24 receives an actual rotational speed ω of the motor 9 from the rotational speed calculation unit 21, receives a rotational speed command $\omega_{com1}$ from the host control device 20, reads, from the memory 23, a q-axis electric current command value $I_{qcom}$ corresponding to the rotational speed command $\omega_{com1}$ and the actual rotational speed ω of the motor 9, and outputs the read q-axis electric current command value $I_{qcom}$ to the subtracter 26.

The d-axis electric current command value generation unit 25 generates a d-axis electric current command value $I_{dcom}$. For this purpose, the d-axis electric current command value generation unit 25 receives an actual rotational speed ω of the motor 9 from the rotational speed calculation unit 21, receives a rotational speed command $\omega_{com1}$ from the host control device 20, reads, from the memory 23, a d-axis electric current command value $I_{dcom}$ corresponding to the rotational speed command $\omega_{com1}$ and the actual rotational speed ω of the motor 9, and outputs the read d-axis electric current command value $I_{dcom}$ to the subtracter 27.

The subtracter 26 includes a non-inverting input unit to which the q-axis electric current command value $I_{qcom}$ is input, an inverting input unit to which the q-axis electric current $I_q$ is input, and an output unit outputting an electric current error $\Delta I_q$ that is a result of subtraction between the q-axis electric current command value $I_{qcom}$ and a value of the q-axis electric current $I_q$. The subtracter 27 includes a non-inverting input unit to which a d-axis electric current command value $I_{dcom}$ is input, an inverting input unit to which a d-axis electric current $I_d$ is input, and an output unit outputting an electric current error $\Delta I_d$ that is a result of subtraction between the d-axis electric current command value $I_{dcom}$ and a value of the d-axis electric current $I_d$.

The PI control unit 28 receives an electric current error $\Delta I_q$, performs proportional integral calculation on the electric current error $\Delta I_q$ to generate a q-axis voltage command value $V_q$, and outputs the q-axis voltage command value $V_q$ to the command voltage generation unit 30. The PI control unit 29 receives the electric current error $\Delta I_d$, performs proportional integral calculation on the electric current error $\Delta I_d$ to generate a d-axis voltage command value $V_d$, and outputs the d-axis voltage command value $V_d$ to the command voltage generation unit 30.

The command voltage generation unit 30 generates a U-phase voltage command value $V_U$, a V-phase voltage command value $V_V$, and a W-phase voltage command value $V_W$ on the basis of the q-axis voltage command value $V_q$ and the d-axis voltage command value $V_d$. For this purpose, the command voltage generation unit 30 is constituted by a coordinate conversion unit performing rotational coordinate conversion and two-phase-to-three-phase conversion. Accordingly, the command voltage generation unit 30 converts, into the U-phase voltage command value $V_U$, the V-phase voltage command value $V_V$, and the W-phase voltage command value $V_W$ of the three phases, the d-axis voltage command value $V_d$ and the q-axis voltage command value $V_q$ of the two phases expressed by a rotational coordinate system that is rotated by the rotational angle θ1 with respect to a fixed coordinate system (α-β coordinate system). Then, the command voltage generation unit 30 outputs the U-phase voltage command value $V_U$, the V-phase voltage command value $V_V$, and the W-phase voltage command value $V_W$ to the PWM signal generation unit 31.

The PWM signal generation unit 31 generates a PWM signal $V_{PWM1}$ (in this case, signals $V_{PWM1-1}$ $V_{PWM1-2}$ $V_{PWM1-3}$ $V_{PWM1-4}$ $V_{PWM1-5}$, and $V_{PWM1-6}$ corresponding to the respective transistors of the inverter 4) on the basis of the U-phase voltage command value $V_U$, the V-phase voltage command value $V_V$, and the W-phase voltage command value $V_W$, and outputs the PWM signal $V_{PWM1}$ to the inverter 4 to drive the motor 9. For this purpose, the PWM signal generation unit 31 generates the PWM signal $V_{PWM1}$ on the basis of a carrier frequency corresponding to one cycle (e.g., 250 microseconds) of a timer (not illustrated) incorporated in the motor control device 15.

In the present embodiment, as described above, the motor control device 15 further includes the temperature estimation device 14 estimating a temperature of one power semiconductor chip that is a temperature estimating target contained in one inverter 4 out of two inverters 4 and 5 arranged in the same heat radiator 6 for driving two motors 9 and 10, respectively. For this purpose, the temperature estimation device 14 includes an electric power loss calculation unit 41 functioning as a first electric power loss calculation unit, a temperature difference calculation unit 42 functioning as a first temperature difference calculation unit, a temperature difference calculation unit 43 functioning as a second temperature difference calculation unit, a temperature calculation unit 44, and a temperature output unit 45.

The electric power loss calculation unit 41 calculates an electric power loss Q1 as a first electric power loss generated in all of the power semiconductor chips of the inverter 4. In the present embodiment, the electric power loss calculation unit 41 calculates the electric power loss Q1 on the basis of a U-phase electric current $I_{U1}$ flowing through the motor 9. The electric power loss calculation unit 41 outputs the electric power loss Q1 to the temperature difference calculation unit 42, the temperature difference calculation unit 43, and the temperature estimation device 16 included in the motor control device 17. For example, when an electric resistance of the inverter 4 is R, and a DC current value corresponding to the U-phase electric current $I_{U1}$ is $|I_{U1}|$, the electric power loss Q1 can be expressed by the following formula.

$$Q1 = R|I_{U1}|^2$$

In this formula, a DC current value $|I_{U1}|$ is obtained by inputting an electric current detection signal output by the electric current detector 7U, to an analogue-to-digital converter (not depicted), and converting the electric current detection signal into digital data. The digital data is input to the electric power loss calculation unit 41.

In the present embodiment, the electric power loss calculation unit 41 performs calculation of the electric power loss Q1 depending on a carrier frequency of a PWM signal $V_{pwm1-1}$ for one of the transistors included in the inverter 4. In other words, under the condition that a DC current value $|I_{U1}|$ is constant, the electric power loss calculation unit 41 increases the electric power loss Q1 as a carrier frequency of a PWM signal $V_{PWM1-1}$ increases.

The temperature difference calculation unit 42 calculates, on the basis of the electric power loss Q1, a temperature difference ΔT1 as a first temperature difference between the heat radiator 6 and the inverter 4 containing one power semiconductor chip as the temperature estimating target. For this purpose, the electric power loss Q1 is input to the temperature difference calculation unit 42 from the electric power loss calculation unit 41. The temperature difference calculation unit 42 outputs the temperature difference ΔT1 to the temperature calculation unit 44. In the present embodiment, the temperature difference ΔT1 can be expressed by a variable F(Q1) that changes in accordance with the electric power loss Q1. In other words, the temperature difference ΔT1 can be expressed by the following formula.

$$\Delta T1 = F(Q1)$$

For example, when a heat resistance of the inverter 4 is θ1, a variable F(Q1) can be expressed by the following formula.

$$F(Q1) = \theta 1 * Q1$$

The temperature difference calculation unit 43 calculates a temperature difference ΔT2 on the basis of the electric power loss Q1 and an electric power loss Q2. The temperature difference ΔT2 is a second temperature difference between a temperature of the heat radiator 6 and an outside air temperature TA, and the electric power loss Q2 is a second electric power loss generated in all the power semiconductor chips of the inverter 5. For this purpose, the temperature difference calculation unit 43 receives the electric power loss Q1 from the electric power loss calculation unit 41, and receives the electric power loss Q2 from the temperature estimation device 16. The temperature difference calculation unit 43 outputs the temperature difference ΔT2 to the temperature calculation unit 44. In the present embodiment, the temperature difference ΔT2 can be expressed by a variable G(Q1, Q2) changing in accordance with the electric power loss Q1 and the electric power loss Q2. In other words, the temperature difference ΔT2 can be expressed by the following formula.

$$\Delta T2 = G(Q1, Q2)$$

For example, when a heat resistance of the heat radiator 6 is θ2, the variable G(Q1, Q2) can be expressed by the following formula.

$$G(Q1, Q2) = \theta 2(Q1 + Q2)$$

The temperature calculation unit 44 calculates, on the basis of an outside air temperature TA, a temperature difference ΔT1, and a temperature difference ΔT2, a temperature T1 of one power semiconductor chip that is the temperature estimating target and that is contained in the inverter 4. For this purpose, the temperature calculation unit 44 receives the outside air temperature TA detected by the temperature sensor 13, receives the temperature difference ΔT1 from the temperature difference calculation unit 42, and receives the temperature difference ΔT2 from the temperature difference calculation unit 43. The temperature calculation unit 44 outputs the temperature T1 to the warning output unit 18 through the temperature output unit 45. The temperature output unit 45 is constituted by an input-output port or the like. In the present embodiment, the temperature T1 is expressed by the sum of the outside air temperature TA, the temperature difference ΔT1, and the temperature difference ΔT2. In other words, the temperature T1 can be expressed by the following formula.

$$T1 = TA + \Delta T1 + \Delta T2$$

The motor control device 17 receives, from respective electric current detectors 8U and 8V, a U-phase electric current $I_{U2}$, a V-phase electric current $I_{V2}$ of the two phases out of the U-phase electric current $I_{U2}$, the V-phase electric current $I_{V2}$, a W-phase electric current $I_{W2}$ of the three phases flowing through the motor 10, receives the rotational angle θ2 from the rotational angle detection unit 12, receives the outside air temperature TA detected by the temperature sensor 13, and receives the electric power loss Q1 from the electric power loss calculation unit 41. The motor control device 17 generates a PWM signal $V_{PWM2}$ (in this case, signals $V_{PWM2\text{-}1}$, $V_{PWM2\text{-}2}$, $V_{PWM2\text{-}3}$, $V_{PWM2\text{-}4}$, $V_{PWM2\text{-}5}$, and $V_{PWM2\text{-}6}$ corresponding to the respective transistors of the inverter 5) on the basis of the received U-phase electric current $I_{U2}$, the V-phase electric current $I_{V2}$, and the rotational angle θ2, and outputs the PWM signal $V_{PWM2}$ to the inverter 5 to drive the motor 10. For this purpose, the motor control device 17 generates the PWM signal $V_{PWM2}$ on the basis of a carrier frequency corresponding to one cycle (e.g., 250 microseconds) of a timer incorporated in the motor control device 17.

In the present embodiment, the motor control device 17 includes the temperature estimation device 16 estimating a temperature of one power semiconductor chip that is a temperature estimating target and that is contained in one inverter 5 out of the two inverters 4 and 5 arranged in the same heat radiator 6 for driving the two motors 9 and 10, respectively. For this purpose, the temperature estimation device 16 calculates, on the basis of the input U-phase electric current $I_{U2}$, the V-phase electric current $I_{V2}$, and the outside air temperature TA, the electric power loss Q2 generated in all the power semiconductor chips of the inverter 5, and outputs the electric power loss Q2 to the temperature difference calculation unit 43. The temperature estimation device 16 estimates, on the basis of the outside air temperature TA, the electric power loss Q1 and the electric power loss Q2, a temperature T2 of one power semiconductor chip that is the temperature estimating target and that is contained in the inverter 5, and outputs the estimated temperature T2 to the warning output unit 19.

In the present embodiment, the motor control device 17 calculates the electric power loss Q2 depending on a carrier frequency of a PWM signal $V_{PWM2\text{-}1}$ for one transistor included in the inverter 5. In other words, the motor control device 17 increases the electric power loss Q2 as a carrier frequency of the PWM signal $V_{PWM2\text{-}1}$ increases, under the condition that a DC current value $|I_{U2}|$ is constant, the DC current value $|I_{U2}|$ being obtained by inputting, to an analogue-to-digital converter (not illustrated), an electric current detection signal output by the electric current detector 8U, and thereby converting the input electric current detection signal into digital data.

The warning output unit 18 compares a temperature T1 with a predetermined temperature (e.g., a rated temperature set by a manufacturer of the power semiconductor chips). When the temperature T1 is higher than the predetermined temperature, the warning output unit 19 outputs an alarm signal A1 to the host control device 20.

The warning output unit 19 compares a temperature T2 with a predetermined temperature (e.g., a rated temperature set by a manufacturer of the power semiconductor chips). When the temperature T2 is higher than the predetermined temperature, the warning output unit 18 outputs an alarm signal A2 to the host control device 20.

In the present embodiment, the motor control device 15 and the warning output device 18 are each embodied by a processor including an input-output port, a serial communication circuit, an analogue-to-digital converter, a timer, and the like, and each performs various processes in accordance with a processing program stored in a memory not illustrated. The motor control device 17 and the warning output device 19 are each embodied by another processor including an input-output port, a serial communication circuit, an analogue-to-digital converter, a timer, etc., and each performs various processes in accordance with a processing program stored in a memory not illustrated.

The host control device 20 is constituted by a computer numerical controller (CNC), etc., outputs a rotational speed command value $\omega_{com1}$ to the q-axis electric current command value generation unit 24 and the d-axis electric current command value generation unit 25, and outputs a rotational speed command value $\omega_{com2}$ to the motor control device 17. In the present embodiment, when the alarm signal A1 is input to the host control device 20, the host control device 20 outputs, to the q-axis electric current command value generation unit 24 and the d-axis electric current command value generation unit 25, the rotational speed command value $\omega_{com1}$ (i.e., the rotational speed command value $\omega_{com1}$ of zero) for causing an output of the motor 9 to be zero, or the rotational speed command value $\omega_{com1}$ (i.e., the rotational speed command value $\omega_{com1}$ smaller than a preceding rotational speed command value $\omega_{com1}$) for decreasing the output of the motor 9. Meanwhile, when the alarm signal A2 is input to the host control device 20, the host control device 20 outputs, to the motor control device 17, the rotational speed command value $\omega_{com2}$ (i.e., the rotational speed command value $\omega_{com2}$ of zero) for causing an output of the motor 10 to be zero, or the rotational speed command value $\omega_{com2}$ (i.e., the rotational speed command value $\omega_{com2}$ smaller than a preceding rotational speed command value $\omega_{com2}$) for decreasing the output of the motor 10. In this manner, the motor control device 15 restricts or stops the output of the motor 9 when the temperature T1 estimated by the temperature estimation device 14 exceeds the outside air temperature TA. Accordingly, the inverters 4 and 5 can be appropriately protected from heat.

According to the present embodiment, the outside air temperature TA which is the reference temperature, the electric power loss Q1 corresponding to heat generated by all the power semiconductor chips of the inverter 4 containing one power semiconductor chip as the temperature estimating target, and the electric power loss Q2 corresponding to heat generated by all the power semiconductor chips of the inverter 5 that is one or more power semiconductor modules other than the inverter 4 containing one power semiconductor chip as the temperature estimating target are obtained without installing the temperature sensor 13 in the heat radiator 6. Then, on the basis of the outside air temperature TA, the electric power loss Q1, and the electric power loss Q2, the temperature T1 of one power semiconductor chip that is the temperature estimating target and that is contained in the inverter 4 is estimated. Thereby, even when the temperature T1 of one power semiconductor chip that is the temperature estimating target and that is contained in the inverter 4 is different from the temperature T2 of one power semiconductor chip that is the temperature estimating target and that is contained in the inverter 5, heat influence exerted on the heat radiator 6 by all the power semiconductor chips of the inverter 5 can be taken into consideration. Accordingly, it is possible to accurately estimate the temperature T1 of one power semiconductor chip that is the temperature estimating target and that is contained in the inverter 4.

Figure 3:
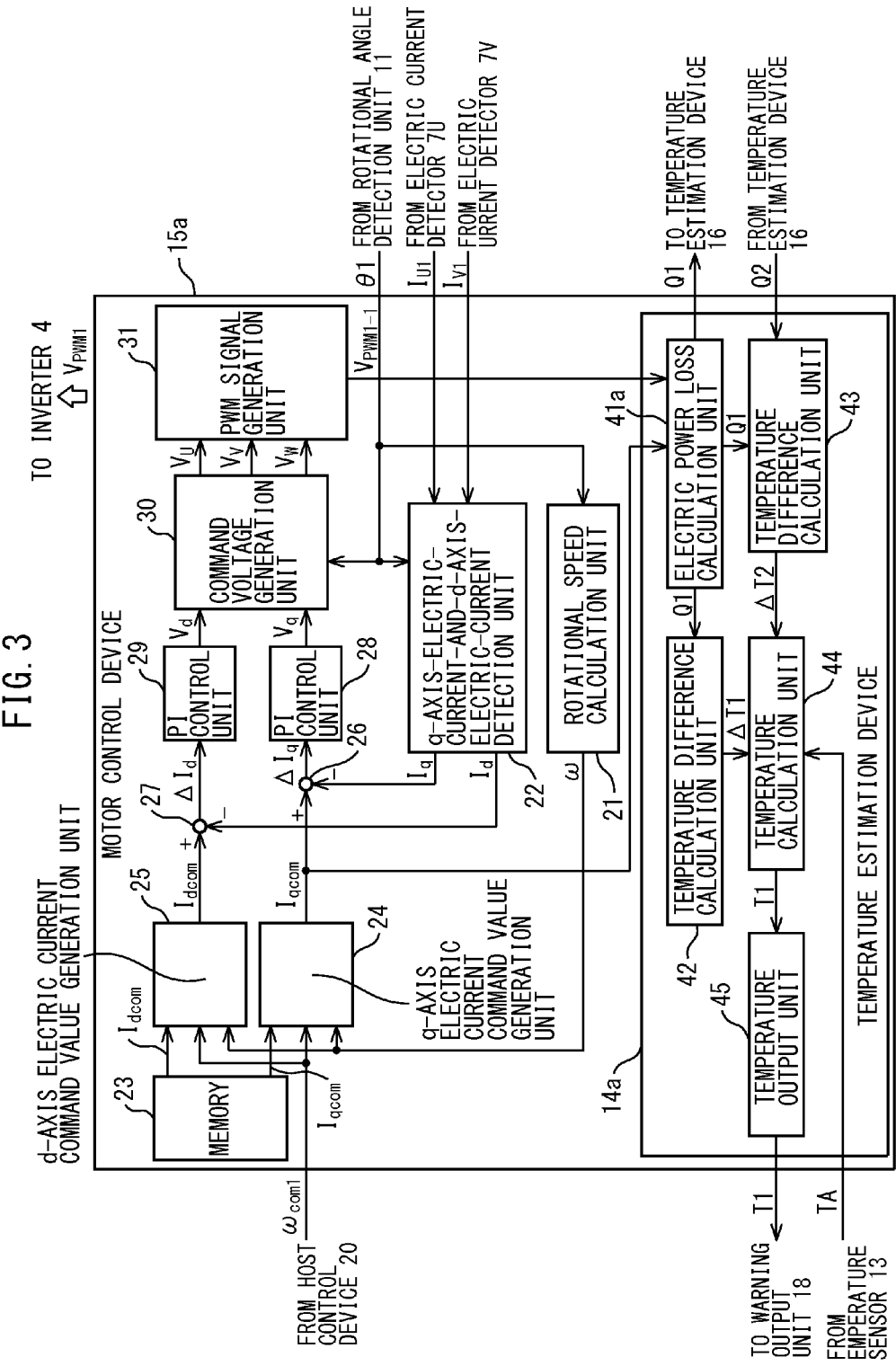
FIG. 3 is a block diagram of a motor control device including a temperature estimation device according to a second embodiment.

FIG. 3 is a block diagram of a motor control device including a temperature estimation device according to a second embodiment. A motor control device 15a illustrated in FIG. 3 is used instead of the motor control device 15 in the system illustrated in FIG. 1. A temperature estimation device 14a included in the motor control device 15a includes an electric power loss calculation unit 41a instead of the electric power loss calculation unit 41 calculating the electric power loss Q1 on the basis of the U-phase electric current $I_{U1}$. The electric power loss calculation unit 41a functions as a first electric power loss calculation unit calculating the electric power loss Q1 on the basis of the q-axis electric current command value $I_{qcom}$. For this purpose, the electric power loss calculation unit 41a receives the q-axis electric current command value $I_{qcom}$ from the q-axis electric current command value generation unit 24, and outputs calculated electric power loss Q1 to the temperature difference calculation unit 42, the temperature difference calculation unit 43, and the temperature estimation device 16 included in the motor control device 17.

In the present embodiment, the electric power loss calculation unit 41a calculates the electric power loss Q1 depending on a carrier frequency of the PWM signal $V_{PWM1-1}$ for one of the transistors included in the inverter 4. In other words, under the condition that a q-axis electric current command value $I_{qcom}$ is constant, the electric power loss calculation unit 41a increases the electric power loss Q1 as a carrier frequency of the PWM signal $V_{PWM1-1}$ increases.

Figure 4:
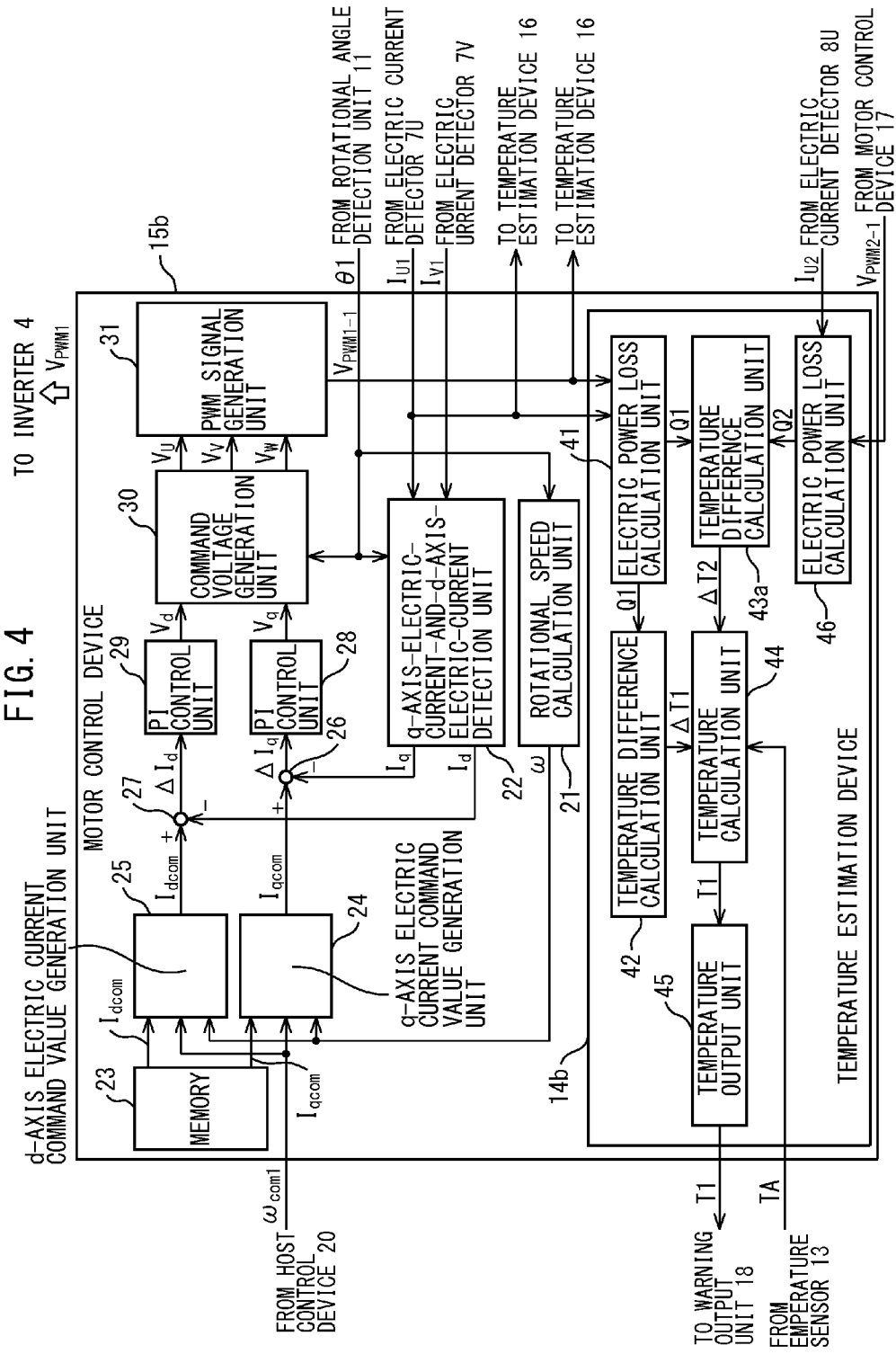
FIG. 4 is a block diagram of a motor control device including a temperature estimation device according to a third embodiment.

FIG. 4 is a block diagram of a motor control device including a temperature estimation device according to a third embodiment. A motor control device 15b illustrated in FIG. 4 is used instead of the motor control device 15 in the system illustrated in FIG. 1. A temperature estimation device 14b included in the motor control device 15b includes the electric power loss calculation unit 41, the temperature difference calculation unit 42, the temperature difference calculation unit 43a, the temperature calculation unit 44, the temperature output unit 45, and an electric power loss calculation unit 46 functioning as a second electric power loss calculation unit. The electric power loss calculation unit 46 receives the U-phase electric current $I_{U2}$ from the electric current detector 8U, and calculates the electric power loss Q2 on the basis of the U-phase electric current $I_{U2}$. The electric power loss calculation unit 46 outputs the electric power loss Q2 to the temperature difference calculation unit 43a. The temperature difference calculation unit 43a receives the electric power loss Q1 from the electric power loss calculation unit 41, receives the electric power loss Q2 from the electric power loss calculation unit 46, and calculates the temperature difference ΔT2 on the basis of the electric power loss Q1 and the electric power loss Q2. Then, the temperature difference calculation unit 43a outputs the temperature difference ΔT2 to the temperature calculation unit 44. When the motor control device 15b is used in the system illustrated in FIG. 1, the motor control device 17 receives the U-phase electric current $I_{U1}$ from the electric current detector 7U.

In the present embodiment, the electric power loss calculation unit 46 calculates the electric power loss Q2 depending on a carrier frequency of the PWM signal $V_{PWM2-1}$ for one of the transistors included in the inverter 5. In other words, the electric power loss calculation unit 46 increases the electric power loss Q2 as a carrier frequency of the PWM signal $V_{PWM2-1}$ increases, under the condition that a DC current value $|I_{U2}|$ is constant, the DC current value $|I_{U2}|$ being obtained by inputting, to an analogue-to-digital converter (not illustrated), an electric current detection signal output by the electric current detector 8U, and thereby converting the electric current detection signal into digital data.

Figure 5:
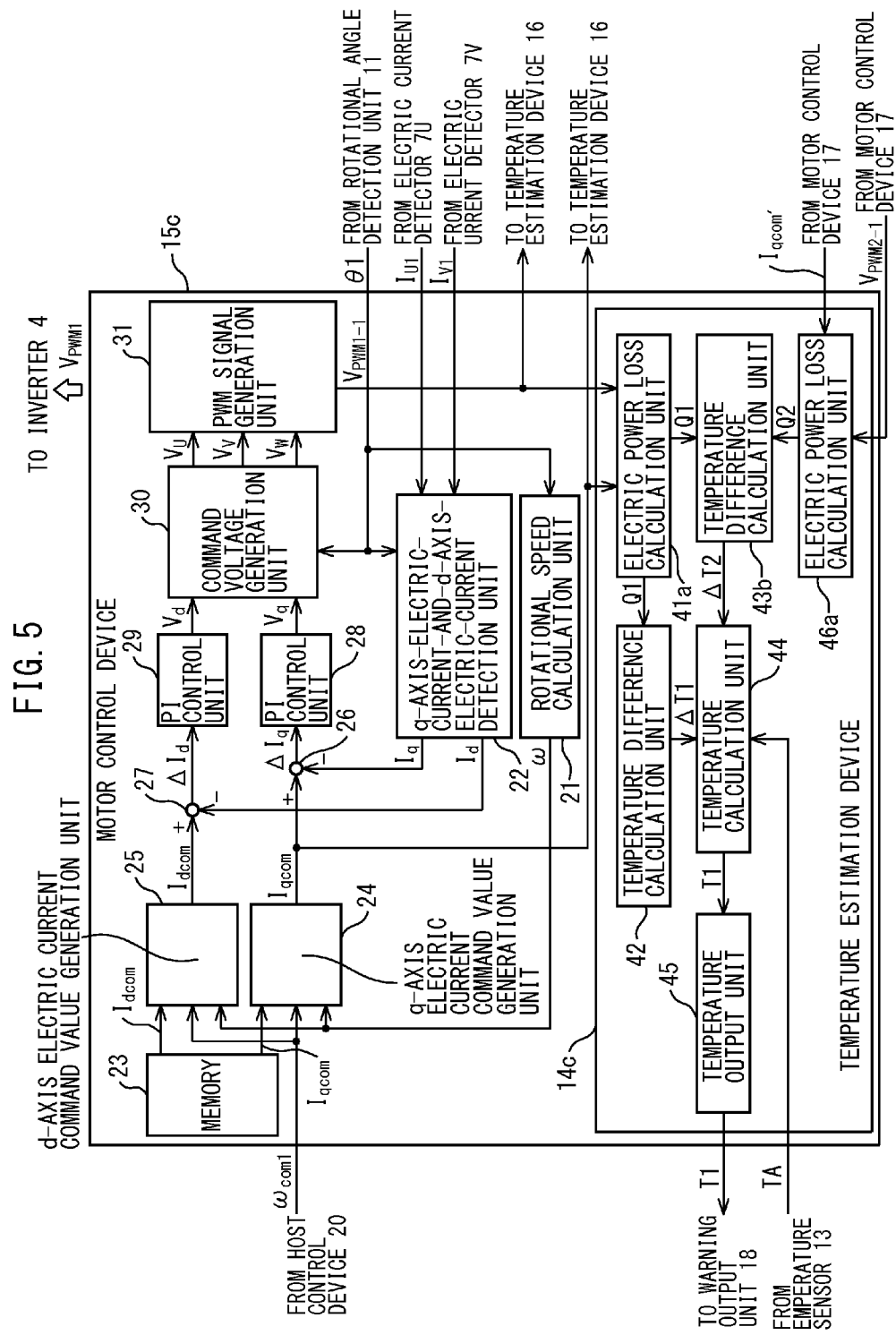
FIG. 5 is a block diagram of a motor control device including a temperature estimation device according to a fourth embodiment.

FIG. 5 is a block diagram of a motor control device including a temperature estimation device according to a fourth embodiment. A motor control device 15c illustrated in FIG. 5 is used instead of the motor control device 15 in the system illustrated in FIG. 1. A temperature estimation device 14c included in the motor control device 15c includes the electric power loss calculation unit 41a, the temperature difference calculation unit 42, the temperature difference calculation unit 43b, the temperature calculation unit 44, the temperature output unit 45, and the electric power loss calculation unit 46a functioning as a second electric power loss calculation unit. The electric power loss calculation unit 46a receives, from the motor control device 17, a q-axis electric current command value $I_{qcom}'$ for the motor 10, and calculates the electric power loss Q2 on the basis of the q-axis electric current command value $I_{qcom}'$. Then, the electric power loss calculation unit 46a outputs the electric power loss Q2 to the temperature difference calculation unit 43b. The temperature difference calculation unit 43b receives the electric power loss Q1 from the electric power loss calculation unit 41a, receives the electric power loss Q2 from the electric power loss calculation unit 46a, and calculates the temperature difference ΔT2 on the basis of the electric power loss Q1 and the electric power loss Q2. Then, the temperature difference calculation unit 43b outputs the temperature difference ΔT2 to the temperature calculation unit 44. When the motor control device 15c is used in the system illustrated in FIG. 1, the motor control device 17 receives the q-axis electric current command value $I_{qcom}$ from the q-axis electric current command value generation unit 24.

In the present embodiment, the electric power loss calculation unit 46a calculates the electric power loss Q2 depending on a carrier frequency of the PWM signal $V_{PWM2-1}$ for one of the transistors included in the inverter 5. In other words, under the condition that a q-axis electric current command value $I_{qcom}'$ is constant, the electric power loss calculation unit 46a increases the electric power loss Q2 as a carrier frequency of a PWM signal $V_{PWM2-1}$ increases.

The present invention is not limited to the above-described embodiments, and numerous alterations and modifications can be made. For example, although the above description in the first to fourth embodiments is made for the case where the two inverters (two power semiconductor modules) are arranged in the same heat radiator, a temperature estimation device according to the present invention can be applied to the case where three or more inverters (three or more power semiconductor modules) are arranged in the same heat radiator. When n inverters (n is an integer that is three or more) are arranged in the same heat radiator, and the electric power losses generated in all the power semiconductor chips of the respective inverters are Q1, Q2, . . . , Qn, a temperature difference ΔT2 can be expressed by a variable G(Q1, Q2, . . . , Qn) that varies in accordance with the electric power loss Q1 and the electric power loss Q2. In other words, the temperature difference ΔT2 can be expressed by the following formula.

$$\Delta T2 = G(Q1, Q2, \ldots, Qn)$$

Although the above description in the first to fourth embodiments is made for the case where the inverters respectively corresponding to a plurality of the motors are arranged in the same heat radiator, i.e., when the power semiconductor modules (in this case, two power semiconductor modules) of which number is the same as the number of the motors are arranged in the same heat radiator, a temperature estimation device according to the present invention can be applied to the case where a converter as well as the inverters respectively corresponding to a plurality of the motors are arranged in the same heat radiator. In this case, the number of the power semiconductor modules arranged in the same heat radiator is larger than the number of the motors.

Furthermore, although the above description in the first to fourth embodiments is made for the case where an outside air temperature is used as a reference temperature, a temperature other than an outside air temperature (e.g., 0° C. or a rated temperature set by a manufacturer of the power semiconductor chips) can be used as a reference temperature.

Although the above description in the first to fourth embodiments is made for the case where the electric power loss depending on a carrier frequency of a PWM signal is calculated, the electric power loss depending on the carrier frequency of the PWM signal may not need to be calculated.

In the above-described first to fourth embodiments, the motor control device may include a reference temperature detection unit (temperature sensor) and a warning output unit.

Further, although the above description in the first to fourth embodiments is made for the case where the temperature estimation device is included in the motor control device, a temperature estimation device may be provided a position (e.g., a position in the host control device) outside the motor control device.

According to the present invention, it is possible to provide a temperature estimation device capable of accurately estimating a temperature of one power semiconductor chip that is a temperature estimating target and that is included in one or more power semiconductor chips contained in one power semiconductor module out of power semiconductor modules that are arranged in the same heat radiator and of which number is equal to or larger than the number of motors. Further, according to the present invention, it is possible to provide a motor control device including the temperature estimation device.

What is claimed is:

1. A temperature estimation device estimating a temperature of one power semiconductor chip that is a temperature estimating target and that is included in one or more power semiconductor chips contained in one power semiconductor module out of power semiconductor modules whose number is equal to or larger than the number of a plurality of motors and that are arranged in the same heat radiator for driving the plurality of motors, respectively, the temperature estimation device comprising:
a first electric power loss calculation unit calculating a first electric power loss corresponding to an electric power loss generated in all power semiconductor chips of the power semiconductor module containing the one power semiconductor chip that is the temperature estimating target;
a first temperature difference calculation unit calculating, on the basis of the first electric power loss, a first temperature difference corresponding to a temperature difference between the heat radiator and the power semiconductor module containing the one power semiconductor chip that is the temperature estimating target;
a second temperature difference calculation unit calculating, on the basis of the first electric power loss and a second electric power loss, a second temperature difference corresponding to a temperature difference between the heat radiator and a reference temperature, the second electric power loss corresponding to an electric power loss generated in all power semiconductor chips of one or more power semiconductor modules other than the power semiconductor module containing the one power semiconductor chip that is the temperature estimating target;
a temperature calculation unit calculating a temperature of the one power semiconductor chip that is the temperature estimating target, on the basis of the reference temperature, the first temperature difference, and the second temperature difference; and
a temperature output unit outputting the temperature calculated by the temperature calculation unit.

2. The temperature estimation device according to claim 1, wherein the first electric power loss calculation unit calculates the first electric power loss on the basis of one of an electric current and an electric current command value the electric current flowing through one motor corresponding to the power semiconductor module containing the one power semiconductor chip that is the temperature estimating target, and the electric current command value being generated for the one motor corresponding to the power semiconductor module containing the one power semiconductor chip that is the temperature estimating target.

3. The temperature estimation device according to claim 2, wherein the first electric power loss calculation unit calculates the first electric power loss depending on a carrier frequency of a PWM signal or PWM signals input to the power semiconductor module containing the one power semiconductor chip that is the temperature estimating target.

4. The temperature estimation device according to claim 1, further comprising a second electric power loss calculation unit calculating the second electric power loss.

5. The temperature estimation device according to claim 4, wherein the second electric power loss calculation unit calculates the second electric power loss on the basis of one of an electric current or electric currents flowing through one or more motors other than one motor corresponding to the power semiconductor module containing the one power semiconductor chip that is the temperature estimating target, and an electric current command value or electric current command values for the one or more motors other than the one motor corresponding to the power semiconductor module containing the one power semiconductor chip that is the temperature estimating target.

6. The temperature estimation device according to claim 5, wherein the second electric power loss calculation unit calculates the second electric power loss depending on a carrier frequency of a PWM signal or PWM signals input to the one or more power semiconductor modules other than the power semiconductor module containing the one power semiconductor chip that is the temperature estimation target.

7. A motor control device controlling motors that are driven by an electric power stored in a DC link unit connected to an AC power supply via a converter constituted by one power semiconductor module containing at least one semiconductor chip, the motor control device comprising the temperature estimation device according to claim 1.

8. The motor control device according to claim 7, wherein the motor control device restricts or stops output of the motors when a temperature estimated by the temperature estimation device exceeds the reference temperature.

\* \* \* \* \*